United States Patent [19]

Plunkett et al.

[11] 4,321,478

[45] Mar. 23, 1982

[54] AUXILIARY POWER SUPPLY WITH KINETIC ENERGY STORAGE

[75] Inventors: Allan B. Plunkett; Fred G. Turnbull, both of Scotia, N.Y.

[73] Assignee: General Electric Company, Schenectady, N.Y.

[21] Appl. No.: 93,684

[22] Filed: Nov. 13, 1979

[51] Int. Cl.³ .............................................. H02K 7/02
[52] U.S. Cl. ...................................... 307/47; 318/150; 318/161
[58] Field of Search ...................... 307/44, 47, 52, 64, 307/68, 45, 46, 64, 68, 85, 86, 87; 290/3, 4; 310/74; 318/150, 161

[56] References Cited

U.S. PATENT DOCUMENTS

| | | | |
|---|---|---|---|
| 3,541,409 | 11/1970 | Storsand | 318/150 |
| 3,665,495 | 5/1972 | Carter et al. | 290/4 R X |
| 3,667,012 | 5/1972 | Kilgore | 318/161 |
| 4,001,666 | 1/1977 | Grenfell | 310/74 X |

Primary Examiner—Michael L. Gellner
Assistant Examiner—James L. Dwyer
Attorney, Agent, or Firm—William H. Steinberg; James C. Davis, Jr.; Marvin Snyder

[57] ABSTRACT

Alternating current is supplied to an auxiliary load on a transit car from a power supply comprised of a DC-energized inverter and a synchronous machine coupled to the inverter. The inverter supplies the alternating current requirements of the load up to the normal steady state load current magnitude. The synchronous machine stores kinetic energy when the load current load does not exceed its normal steady state magnitude, and converts kinetic energy into electrical energy to supply the load current requirements in excess of its normal steady-state load magnitude and to supply load current whenever the DC source-inverter connection is interrupted. Frequency and amplitude of load voltage are regulated by operator commands through control apparatus coupled to the inverter and the synchronous machine.

10 Claims, 5 Drawing Figures

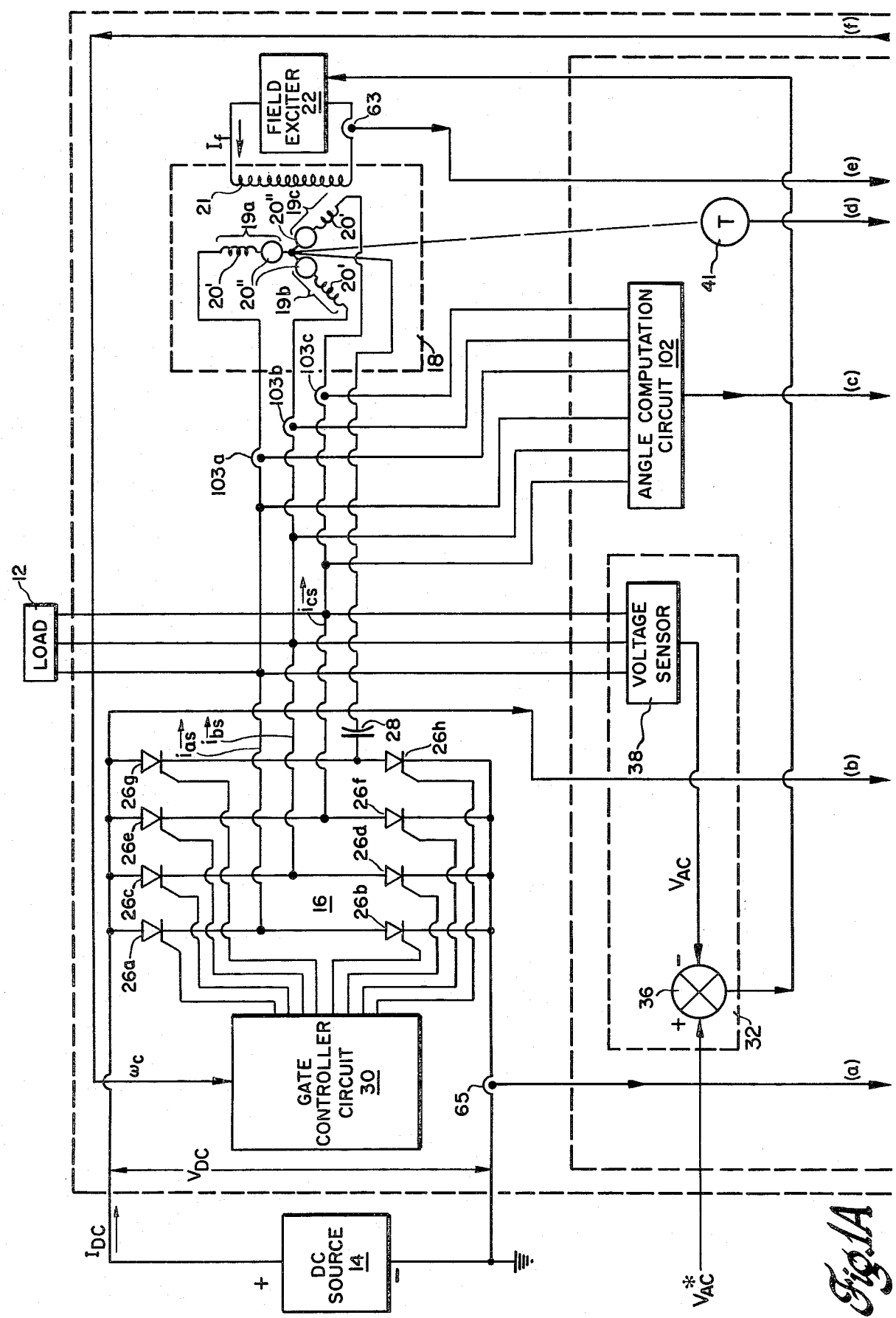

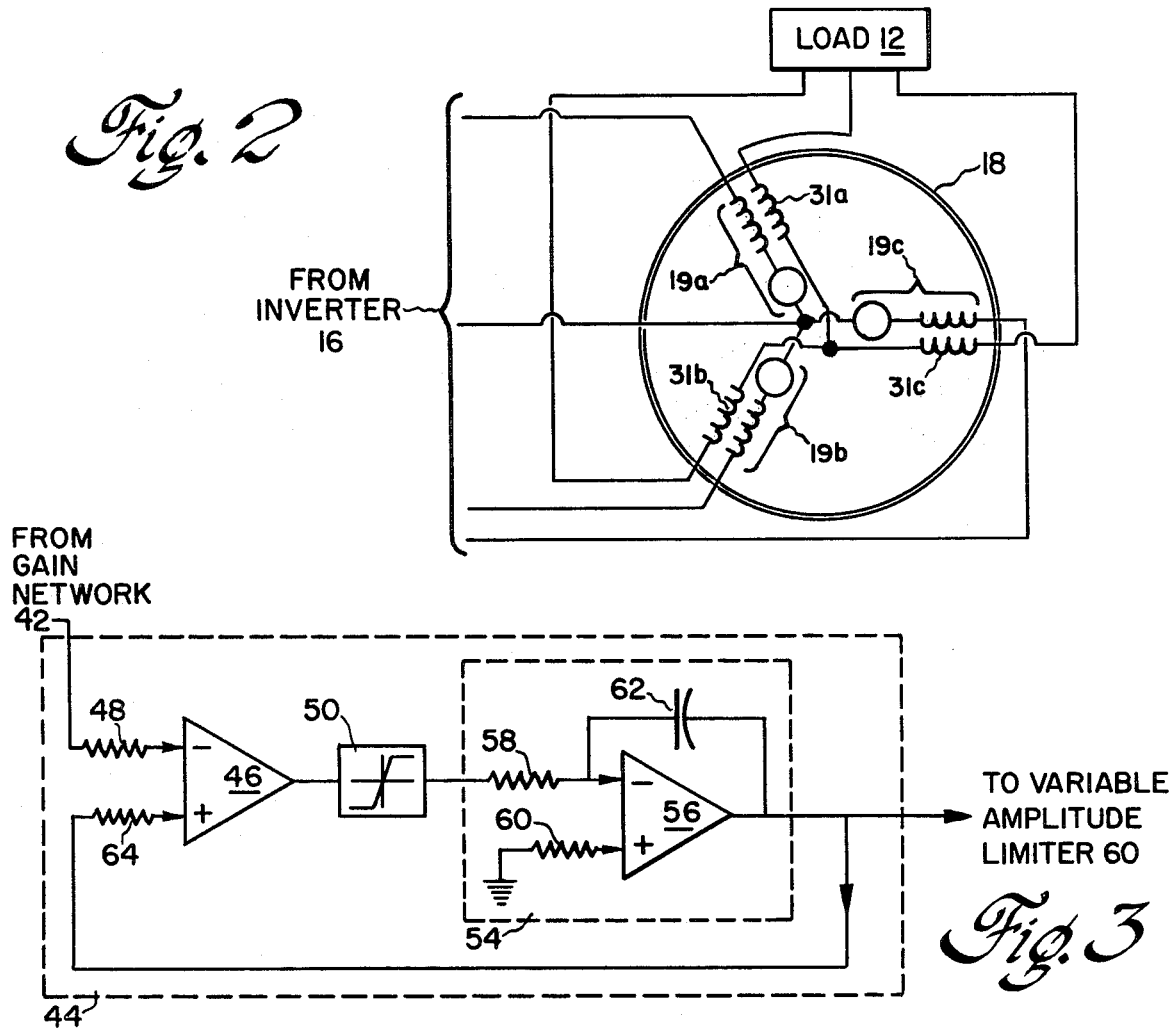
*Fig. 2*
*Fig. 3*
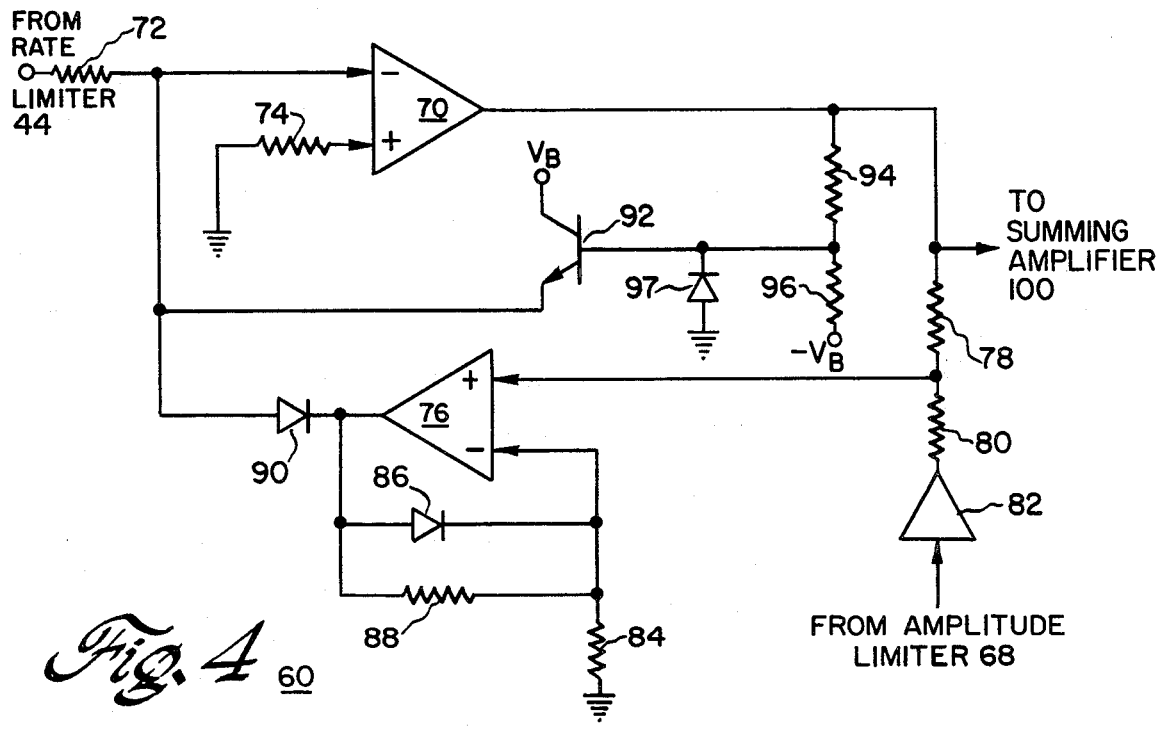
*Fig. 4*

AUXILIARY POWER SUPPLY WITH KINETIC ENERGY STORAGE

BACKGROUND OF THE INVENTION

This invention relates to apparatus for supplying alternating current to a load from a direct current source, and more specifically to a power supply capable of supplying alternating current to a load during intervals when coupling between the direct current source and the power supply is interrupted.

Modern day mass transit rail cars are constructed to include such conveniences as fluorescent lighting and air conditioning in an effort to improve passenger comfort and thereby encourage transit system ridership. Invariably, such transit car auxiliary loads require alternating current for operation. Since mass transit rail cars are usually energized from a direct current source coupled to the track rails, a separate AC power supply is required to convert direct current to alternating current to energize transit car auxiliary loads.

Heretofore, inverters, generally comprised of a plurality of pairs of solid state switching devices, with the switching devices of each pair coupled in series aiding fashion, and each of the pairs of switching devices coupled across the DC source, have been employed to convert direct current to alternating current. Because transit car auxiliary loads such as fluorescent lighting and air conditioning systems tend to draw considerably more current at start-up than during normal steady-state conditions, inverters which supply such transit car auxiliary loads must be sized to supply the peak magnitude of load current rather than the steady-state load current magnitude, thereby increasing the inverter cost. Use of a conventional inverter to supply transit car auxiliary loads with alternating current incurs the disadvantage that when a rail gap is encountered, interrupting the direct current supply to the inverter, transit car auxiliary loads are de-energized. When such loads are re-energized upon passage of rail gap, it may be necessary, if the interruption is of a lengthy duration, e.g 10–15 seconds, to re-synchronize auxiliary loads to the inverter.

The present invention concerns an AC auxiliary power supply for use on transit cars or the like which stores kinetic energy during intervals when auxiliary load current does not exceed its normal steady-state magnitude, and which converts kinetic energy to electrical current to supply all load current in excess of its normal steady-state magnitude and to supply the load with current during intervals of DC source interruption.

BRIEF SUMMARY OF THE INVENTION

Briefly, in accordance with the preferred embodiment of the invention, an AC auxiliary power supply, for use on transit cars or the like, and energized from a direct current source, comprises an inverter coupled between the direct current source and a load for supplying all load current up to the normal steady-state load current magnitude. A synchronous machine, coupled to the inverter and to the load, converts electrical energy into kinetic energy for storage when the load current does not exceed its normal steady-state magnitude. Stored kinetic energy is converted into electrical energy by the synchronous machine to supply the load current requirement in excess of its normal steady-state magnitude and to supply load current whenever the direct current source-inverter link is interrupted. Control apparatus, coupled to the inverter and the synchronous machine, regulates the frequency and amplitude of inverter and synchronous machine output voltage in accordance with operator commands.

It is an object of the present invention to provide a power supply for use on a DC energized transit car or the like for supplying alternating current to a load;

It is another object of the present invention to provide a power supply for use on transit cars or the like which stores kinetic energy when load current does not exceed its normal steady state magnitude, and which converts stored kinetic energy into electrical energy to supply the load current requirement in excess of its normal steady state magnitude.

It is yet another object of the present invention to provide an auxiliary AC supply for use on a transit car or the like which supplies a load with alternating current during the occurrence of rail gaps, thereby avoiding the necessity of having to re-synchronize transit car auxiliary loads.

BRIEF DESCRIPTION OF THE DRAWINGS

The features of the invention believed to be novel are set forth with particularity in the appended claims. The invention itself, both as to organization and method operation together with the further objects and advantages thereof, may best be understood by reference to the following description taken in conjunction with the accompanying drawings in which:

FIGS. A and 1B are a part schematic and part block diagram of the power supply of the present invention;

FIG. 2 is a schematic diagram of an alternative embodiment of the synchronous machine shown in FIG. 1;

FIG. 3 is a part schematic and part block diagram of a rate limiter comprising a portion of the power supply of FIG. 1; and FIG. 4 is a schematic diagram of a variable amplitude limiter comprising a portion of the power supply of FIG. 1.

DETAILED DESCRIPTION OF THE PREFERRED EMBODIMENT

Figure 1B:
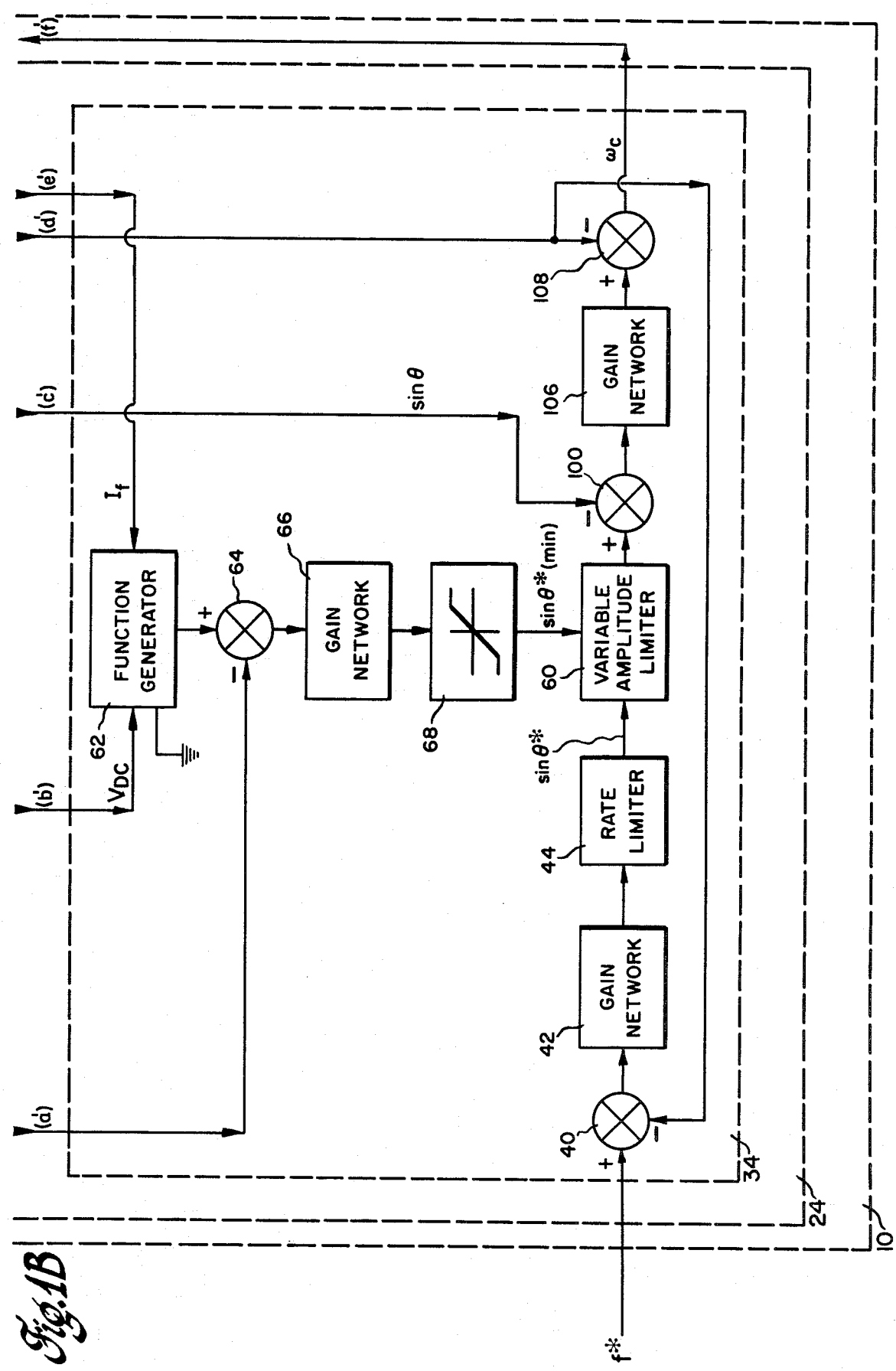

FIGS. 1A and 1B illustrate a power supply 10 according to the present invention for supplying alternating current to a load 12, such as an auxiliary load on a transit car, from a DC source 14 typically a fixed phase rectifier feeding a three rail distribution network. Power supply 10 comprises an inverter 16 coupled to DC source 14 for supplying load 12 with alternating current requirements of the load up to the normal steady load current magnitude. A synchronous machine 18 is coupled to inverter 16 and is coupled in parallel with load 12. Synchronous machine 18 can act both as a motor and a generator, to convert electrical energy into kinetic energy and to convert stored kinetic energy into electrical energy, respectively, depending on the magnitude of current drawn by load 12.

In the presently preferred embodiment, load 12 comprises a three-phase load and, accordingly, synchronous machine 18 comprises a three-phase synchronous machine with each of machine phases 19a, 19b, 19c, such as 19a for example, being represented by a phase inductance 20' coupled in series with a voltage source 20" representing synchronous machine phase back electromotive force (EMF). The field coil 21 of synchronous machine 18 is excited by a field exciter circuit 22 in accordance with a conrol signal supplied by a control apparatus 24 in response to an operator-selected load voltage..

Various field exciter circuits for a three-phase synchronous machine exist and selection of a specific field exciter circuit will necessarily depend on design characteristics. Therefore, the details of field exciter circuit 22 are not shown. For a further, more detailed discussion of synchronous machine field exciter circuit, reference should be had to the text *Power Semiconductor Circuits* by Dewan & Straughen (John Wiley & Sons, 1975).

Inverter 16 is configured of a three-phase bridge inverter and comprises three pairs of solid state switching devices, shown as thyristors 26a and 26b, 26c and 26d and 26e and 26f, respectively, with the thyristors of each thyristor pair coupled in series-aiding fashion, and each of the thyristor pairs coupled across DC source 14. The junction between thyristors 26a and 26b, 26c and 26d, and 26e and 26f, respectively, is coupled to an associated one of machine phases 19a, 19b and 19c, respectively. Auxiliary thyristors 26g and 26h are coupled in series aiding fashion across DC source 14 in parallel with thyristor pairs 26a and 26b, 26c and 26d and 26e and 26f. The junction between auxiliary thyristors 26g and 26h is coupled through a commutating capacitance 28 to the neutral of synchronous machine 18.

Thyristors 26a–26f and thyristors 26g and 26h are rendered conductive in a predetermined sequence responsive to gating signals supplied to the gate of each thyristor by a gate controller circuit 30 in accordance with a thyristor frequency command signal $\omega_c$ supplied to the gate controller circuit. Various thyristor firing circuits exist and selection of a specific thyristor firing circuit will depend on design characteristics. Therefore, the details of gate controller circuit 30 are not shown. For a further, more detailed discussion of thyristor firing circuits, reference should be had to *The General Electric Silicon Controlled Rectifier Handbook*, (5th edition published by Semiconductor Products Department of General Electric Company, Syracuse, N.Y. (1972).

During operation of power supply 10, inverter thyristors 26a, 26c and 26e and inverter thyristors 26f, 26b and 26d are sequentially rendered conductive with each thyristor remaining conductive for an interval of duration ⅓f with f being the frequency of thyristor conduction of thyristors 26f, 26b and 26d each being rendered conductive after an interval of duration 1/6f following the initiation of conduction of thyristors 26a, 26c and 26e, respectively. Initially, thyristors 26a, 26c and 26e, and thyristors 26f, 26b and 26d are each commutated at an appropriate instant following initiation of thyristor conduction when each of thyristors 26g and 26h, respectively, is rendered conductive to couple one of the machine phases in series with capacitance 28 across a then-conductive thyristor. Each of auxiliary thyristors 26g and 26h is itself commutated after having been rendered conductive when one of thyristors 26a, 26c and 26e and one of thyristors 26f, 26b and 26d, respectively, is next rendered conductive.

As a result of the above-described sequence of thyristor conduction, machine 18 is supplied with stator currents $i_{as}, i_{bs}$ and $i_{cs}$ and the machine commences rotation. As inverter thyristors continue to be sequentially rendered conductive, machine stator currents $i_{as}, i_{bs}$ and $i_{cs}$ increase in magnitude and machine speed increases. Once the speed of synchronous machine 18 reaches rated machine speed, auxiliary thyristors 26g and 26h are no longer rendered conductive and each of inverter thyristors 26a–26f is commutated by synchronous machine back EMF. Electrical energy supplied to synchronous machine 18 is converted kinetic energy. Should the magnitude of current drawn by load 12 exceed the magnitude of load current drawn during normal steady-state load conditions, or should the connection between DC source 14 and inverter 16 be interrupted, synchronous machine 18 converts stored kinetic energy into electrical energy to provide the required load current in excess of its normal steady-state magnitude, and to provide load 12 with all of its required current, respectively.

During intervals when load current is below normal steady-state magnitude, inverter 16 alone supplies the load with current, while synchronous machine 12 continues to run at synchronous speed. During intervals of DC source interruption when synchronous machine 18 alone supplies load 12 with alternating current, some reduction in machine speed occurs.

Synchronous machine 18 serves another useful purpose in addition to storing kinetic energy and converting kinetic energy into electrical energy to supply peak load current and the load current drawn during intervals of DC source interruption. The synchronous machine also filters inverter output voltage, to make the waveshape of voltage supplied to load 12 more sinusoidal.

In certain instances, it may be desirable to isolate load 12 from inverter 16. This may be accomplished as shown in FIG. 2 by configuring synchronous machine 18 to include three secondary coils 31a, 31b and 31c, respectively, coupled in a wye-circuit, with each coil positioned within the synchronous machine to cut a portion of the paths traversed by flux generated by machine phases 19a, 19b and 19c, respectively. Each of coils 31a, 31b and 31c is coupled to load 12 so that load 12 may be supplied with the voltage induced in each coil by transformer action during synchronous machine operation.

Referring back to FIGS. 1A and 1B, control apparatus 24, which regulates both the frequency and amplitude of voltage supplied to load 12 by inverter 16 and synchronous machine 18, comprises first and second control loops 32 and 34, respectively. Control loop 32 regulates the amplitude of AC load voltage by varying the excitation supplied by field exciter 22 to field 21 of synchronous machine 18. A summing amplifier 36 is coupled at the first input to a voltage sensor 38, which is coupled to synchronous machine 18 and which provides an output signal proportional to synchronous machine terminal voltage. Typically, voltage sensor 38 comprises a three phase to one phase transformer. The second input of summing amplifier 36 is supplied with a voltage amplitude command signal $V_{AC}^*$ which varies in accordance with an operator-commanded load voltage magnitude. Summing amplifier 36 provides an output signal proportional to the difference between input signal magnitudes supplied to the first and second summing amplifier inputs. The summing amplifier output signal, proportional to the difference between the operator-commanded load voltage magnitude and the actual load voltage magnitude, is supplied to field exciter 22 which varies synchronous machine field excitation accordingly.

A second control loop 34 for regulating the frequency f of inverter thyristor conduction and hence synchronous machine speed and load frequency, comprises a first summing amplifier 40 which is supplied at a first input with a frequency command signal f* proportional to an operator-selected load frequency. A frequency sensing circuit, shown as a tachometer 41 mechanically linked to synchronous machine 18 supplies an output signal proportional to the actual inverter output frequency, and hence the load frequency, to the second input of summing amplifier 40. Alternatively, inverter output frequency can be obtained directly from synchronous machine terminal voltages by a frequency-to-voltage converter.

In accordance with the difference in magnitude between signals supplied to the first and second inputs of summing amplifier 40, the summing amplifier provides a frequency error signal which is supplied to the input of a gain network 42. Gain network 42 scales the summing amplifier frequency error signal to yield a machine phase angle command signal sin $\theta^*$ representative of a desired synchronous machine phase angle relationship magnitude.

To prevent the machine phase angle command signal sin $\theta^*$ from increasing at a rate faster than the maximum phase angle deviation rate for synchronous machine 18, the machine phase angle command signal sin $\theta^*$ generated by gain network 42 is rate limited by a rate limiter 44. Referring now to FIG. 3, rate limiter 44 comprises a differential amplifier 46 the first input of which is coupled through a resistance 48 to the output of gain network 2 shown in FIGS. 1A and 1B. The output of differential amplifier 46 is coupled to the input of an amplitude limiter 50 which is coupled at its output to the input of an integrator 54. Integrator 54 comprises a differential amplifier 56 which is coupled at the first input by a resistance 58 to the output of amplitude limiter 50. The second input to differential amplifier 56 is coupled to ground by a resistance 60. A capacitance 62 couples the first differential amplifier input to the differential amplifier output and causes the differential amplifier output signal to be proportional in amplitude to the integral of the input signal supplied to the first differential amplifier input. A resistance 64 couples the output of differential amplifier 56 to the second input of differential amplifier 46.

Rate limiter 44, when supplied with a machine phase angle command signal sin $\theta^*$, provides an output signal proportional to the difference in magnitude between sin $\theta^*$ and the integral of sin $\theta^*$. In this way, the rate of amplitude increase of sin $\theta^*$ is limited, thereby preventing the magnitude of sin $\theta^*$ from increasing too rapidly.

Referring back to FIGS. 1A and 1B, rate limiter 44 is coupled at the output to the input of a variable amplitude limiter 60 which limits the machine phase angle command signal sin $\theta^*$ amplitude so that it neither exceeds a maximum value nor falls below a minimum value. By maintaining the amplitude of sin $\theta^*$ within a fixed range, synchronous machine back EMF, which is proportional to sin $\theta^*$, is maintained at a sufficient amplitude to permit commutation of each of inverter thyristors 26a–26f at an appropriate instant following initiation of thyristor conduction. The maximum allowable amplitude of sin $\theta^*$ is fixed by the maximum allowable phase angle relationship magnitude for synchronous machine 18. The minimum allowable amplitude of sin $\theta^*$ varies in accordance with synchronous machine 18 field current, denoted $I_f$, and the inverter source voltage $V_{DC}$ (being the output voltage of DC source 14), denoted $V_{DC}$, which may be seen as follows. The forward blocking voltage in each of inverter thyristors 26a–26f is proportional to $V_{DC}$ and hence, the magnitude of synchronous machine EMF required to commutate each thyristor must exceed the magnitude of $V_{DC}$. Since the synchronous machine EMF magnitude (neglecting saturation) is proportional to the synchronous machine field current magnitude, it follows that the minimum allowable machine phase angle command signal amplitude, denoted sin $\theta^*$ (min), and hence, the minimum allowable synchronous machine EMF magnitude, varies as a function of synchronous machine field current $I_f$ and inverter line voltage $V_{DC}$.

The maximum allowable inverter energizing or link current, denoted $I_{DC}*$ also varies in magnitude as a function of $I_f$ and $V_{DC}$. For a load of given impedance, the current carried by each of thyristors 26a–26f and hence $I_{DC}$, the inverter link current varies in accordance with $V_{DC}$. As each inverter thyristor is commutated by synchronous machine 28 back EMF which varies in accordance with synchronous machine field current $I_f$, it follows that the maximum allowable inverter link current $I_{DC}*$ is also dependent on $I_f$ because, unless synchronous machine back EMF is of sufficient amplitude to commutate each of the inverter thyristors at an appropriate instant following initiation of thyristor conduction, then both of the thyristors of each series-connected inverter thyristor pair may be simultaneously conductive, effectively placing a short circuit across DC source 14.

To provide variable amplitude limiter 60 with a minimum machine phase angle amplitude limit, a function generator 62, configured to provide an output signal proportional to the maximum inverter link current $I_{DC}*$ in accordance with inverter source voltage $V_{DC}$ and synchronous machine field current $I_f$, is supplied at the first input with the output voltage of DC source 14. The second input to function generator 62 is coupled to the output of a current sensor 63, typically a DC current transformer which is connected in series with synchronous machine field coil 20 and field exciter 22, and which provides at its output a signal proportional to $I_f$.

Function generator 62 may be configured from any one of several well known function generator circuits adjusted to yield an output signal proportional to the maximum inverter link current in accordance with the inverter source voltage $V_{DC}$ and synchronous machine field current $I_f$. Therefore, the details of function generator circuit 62 are not shown. For a further, more detailed description of function generator circuits, reference should be had to the text *Analog Computation* by Albert Jackson (McGraw Hill, 1961).

A summing amplifier 64 is coupled at a first and a second input to the output of function generator 62 and to the output of a current sensor 65 connected in series with inverter 16 and DC source 14, respectively. Summing amplifier 64 provides an output signal proportional to the difference in magnitude between the maximum possible inverter link current $I_{DC}*$ and the actual inverter link current $I_{DC}$, which signal is supplied to a gain network 66. In accordance with the output signal magnitude of summing amplifier 64, gain network 66 provides a signal sin $\theta^*$ (min), which is amplitude limited by amplitude limiter 68 before being supplied to variable amplitude limiter 60.

Referring to FIG. 4, variable amplitude limiter 60 comprises a first comparator 70 which is coupled at the first input through a resistance 72 to the output of rate limiter 44 shown in FIG. 1. A second resistance 74 couples the second comparator input to circuit ground.

A second comparator 76 is coupled at the first input through a resistance 78 to the output of comparator 70. The serial combination of a resistance 80 and a polarity inverter 82 couple amplitude limiter 68, shown in FIG. 1, to the first input of comparator 76. The second input to comparator 76 is coupled to circuit ground by a resistance 84. Coupled between the second input and output of comparator 76 is the parallel combination of a diode 36 and a resistance 88. A second diode 90 couples the junction between resistance 72 and comparator 70 to the output of comparator 76 for clamping the input voltage to comparator 70.

A transistor 92 is coupled at the collector to a positive voltage source (not shown) of amplitude $V_B$ and at the emitter to the first input of comparator 70. The base of transistor 92 is coupled to circuit ground by a diode 97 and is coupled to the output of comparator 70 by a resistance 94. A resistance 96 couples the transistor base to a second voltage source (not shown) of amplitude $-V_B$. In practice, $V_B$ is approximately 15 volts and each of resistances 94 and 96 are chosen such that when the input voltage to the first input of comparator 70 is equal in magnitude to $V_B$, the voltage measured between the junction of resistances 94 and 96 and circuit ground equals zero.

The lower amplitude limit of the machine phase angle command signal sin $\theta^*$ set by variable amplitude limiter 60 is maintained by comparator 76. When the output signal magnitude of rate limiter 44 of FIG. 1 is less than the magnitude of sin $\theta^*$ (min), the voltage at the first comparator input becomes negative. With a negative voltage at the first comparator input, current is supplied to the first input of comparator 70 thereby causing the output voltage of comparator 70 to increase in magnitude above the magnitude of sin $\theta^*$ (min). Should the magnitude of the input voltage to the first input of comparator 70 exceed $V_B$, the maximum allowable magnitude of sin $\theta^*$, then transistor 92 becomes conductive, thereby conducting a portion of the output current of comparator 70 to circuit ground, causing the comparator output voltage to decrease.

Referring back to FIGS. 1A and 1B, the output of variable amplitude limiter 60 is coupled to the first input of a summing amplifier 100. An angle computation circuit 102, coupled to the junctions between inverter thyristors 26a and 26b, 26c and 26d, and 26e and 26f, and coupled to each of current sensors 103a, 103b and 103c which are each connected in series with inverter 16 and a respective one of synchronous machine phases 19a, 19b and 19c, provides a machine phase angle signal sin $\theta$, in accordance with synchronous machine terminal voltages and stator currents, which signal is supplied to the second input of summing amplifier 100. In accordance with the difference in magnitude between input signals supplied to the first and second summing amplifier inputs, summing amplifier 100 provides an output signal proportional to the difference in magnitude between sin $\theta^*$ and sin $\theta$.

Various circuits for computing the actual machine phase angle relationship in accordance with synchronous machine terminal voltage and synchronous machine stator currents exist, and selection of a specific circuit will necessarily depend on design characteristics. Therefore, the details of angle computation circuit 102 are not shown. For a further, more detailed description of such an angle computation circuit, reference should be had to the copending application Ser. No. 079,693 entitled "Apparatus for Maintaining Synchronism of an Inverter Synchronous Machine Drive System at Light or Zero Machine Loads" filed by Allan B. Plunkett on Sept. 28, 1979 and assigned to the present assignee.

The output of summing amplifier 100 is supplied to a gain network 106 which yields a frequency error signal in accordance with the summing amplifier output signal magnitude, which frequency error signal is supplied to the first input of a summing amplifier 108. The second input to summing amplifier 108 is coupled to tachometer 42. Summing amplifier 108 yields an inverter frequency command signal $\omega_c$ in accordance with the difference in magnitude between input signals supplied to the first and second summing amplifier inputs, which signal is supplied to inverter gate controller circuit 30 to vary the frequency of inverter thyristor conduction accordingly.

By regulating the frequency of inverter thyristor conduction in accordance with the difference in magnitude between the operator-selected inverter frequency and the actual inverter output frequency, control loop 34 advantageously synchronizes inverter 16 to synchronous machine 18, thereby assuring continued commutation of inverter thyristors by synchronous machine back EMF.

The foregoing describes a power supply for use on a transit car or the like for supplying a load with alternating current from a direct current source. Kinetic energy, converted from electrical energy provided by the direct current souce, is stored by the power supply for conversion into electrical energy to supply the load current requirements of the load in excess of its steady state magnitude, and to supply the load current during intervals whenever the direct current source-power supply coupling is interrupted.

While the invention has been particularly shown and described with reference to a preferred embodiment thereof, it will be understood by those skilled in the art that various changes in form and detail may be made therein without departing from the true spirit and scope of the invention as defined by the appended claims.

What is claimed is:

1. A power supply for use on transit cars or the like for supplying an auxiliary load thereon with alternating current from a DC source, comprising:
  (a) an inverter adapted to be coupled between said DC source and said auxiliary load for supplying said load with a predetermined magnitude of current;
  (b) a synchronous machine coupled to said inverter and to said load, said synchronous machine converting electrical energy into kinetic energy when load current does not exceed said predetermined magnitude of current and said synchronous machine converting stored kinetic energy into electrical energy to supply the load current drawn by said load in excess of said predetermined magnitude of current and to supply said load with alternating current whenever coupling between said inverter and said DC source is interrupted; and
  (c) control means adapted to be supplied with a frequency command signal proportional in magnitude to an operator-commanded load frequency and with a voltage command signal proportional in magnitude to an operator-commanded load voltage, said control means coupled to said inverter and said synchronous machine for controlling the frequency and magnitude of load voltage in accordance with operator-commands, said control means having a first control loop for regulating the magnitude of voltage supplied to said load in accordance with the difference magnitude of actual load voltage from said operator-commanded load voltage; said first control loop having a voltage sensor coupled to said load for providing an output signal which varies in accordance with the magnitude of load voltage; and summing amplifier means having a first input adapted to be supplied with said voltage command signal and a second input coupled to said voltage sensor, the output of said summing amplifier means being coupled to said synchronous machine for controlling synchronous machine field current in accordance with the difference magnitude between said voltage sensor output signal and said voltage command signal;

a second control loop for regulating the frequency of voltage supplied to said load in accordance with the difference magnitude of actual load frequency from said operator commanded load frequency.

2. The invention according to claim 1 wherein said load, said synchronous machine, and said inverter are configured for three-phase operation, and said inverter comprises:

(a) three pairs of main switching devices, the switching devices of each of said pairs coupled in series aiding fashion, and each of said pairs coupled across said DC source and adapted for coupling at the respective junction between switching devices to a respective phase of said three phase machine;

(b) a pair of auxiliary switching devices coupled in series aiding fashion across said DC source;

(c) a commutating capacitance coupled between the junction of said pair of auxiliary switching devices and the neutral of said synchronous machine; and (d) gate controller means coupled to each of the switching devices of said three pairs of main switching devices and to each of said pair of auxiliary switching devices; said gate controller means rendering each of the switching devices of said three main pairs of switching devices and of said pair of auxiliary switching devices conductive in a predetermined sequence and at a frequency proportional to an inverter frequency command signal supplied to said gate controller means to supply said load and said synchronous machine with alternating current.

3. The invention according to claim 1 wherein said second control loop comprises:

(a) first circuit means coupled to said synchronous machine for providing an output signal which varies in accordance with synchronous machine speed;

(b) second circuit means having a first input coupled to said first circuit means and a second input adapted to be supplied with said frequency command signal, said second circuit means providing a machine phase angle command signal, representative of a desired synchronous machine phase angle relationship, in accordance with the difference magnitude between said first circuit means output signal and said frequency command signal;

(c) third circuit means coupled to said synchronous machine and to said second circuit means, said third circuit means providing a machine phase angle signal proportional to the actual synchronous machine phase angle relationship and providing a frequency error signal at an output, said frequency error signal varying in accordance with the difference magnitude between said machine phase angle signal and said machine phase angle command signal produced by said second circuit means; and (d) fourth circuit means coupled to said third circuit means, said first circuit means and said inverter, and supplying said inverter with an inverter frequency command signal to regulate load frequency in accordance with the difference magnitude between said third circuit means frequency error signal and said first circuit means output signal.

4. The invention according to claim 3 wherein said first circuit means comprises a tachometer mechanically coupled to the rotor of said synchronous machine.

5. The invention according to claim 3 wherein said second circuit means comprises:

(a) summing amplifier means having a first input coupled to said first circuit means and a second input adapted to be supplied with said frequency command signal, said summing amplifier means providing an error signal which varies in accordance with the difference magnitude between said first circuit means output signal and said frequency command signal; and (b) a gain network coupled to said summing amplifier and configured with preselected gain for amplifying said summing amplifier means error signal to provide said machine phase angle command signal.

6. The invention according to claim 3 wherein said third circuit means comprises:

(a) an angle computation circuit coupled to said synchronous machine for providing said machine phase angle signal in accordance with synchronous machine terminal voltages and stator currents;

(b) summing amplifier means having a first input coupled to said second circuit means and a second input coupled to said angle computation circuit, said summing amplifier means providing an error signal in accordance with the difference magnitude between said second circuit means machine phase angle command signal and said angle computation circuit machine phase angle signal; and (c) a gain network coupled to said summing amplifier and configured with preselected gain for amplifying said summing amplifier means error signal to provide said frequency error signal.

7. The invention according to claim 3 wherein said fourth circuit means comprises a summing amplifier having a first input coupled to said first circuit means and a second input coupled to said third circuit means, said summing amplifier providing said inverter frequency command signal in accordance with the difference magnitude between said first circuit means output signal and said third circuit means frequency error signal.

8. The invention according to claim 3 further including rate limiter means coupled between said second circuit means and said third circuit means for limiting rate of change of magnitude of said second circuit means machine phase angle command signal.

9. The invention according to claim 3 further including variable amplitude limiter means coupled between said second circuit means and said third circuit means for maintaining the magnitude of said second circuit means machine phase angle command signal so that said machine phase angle command signal is greater than a minimum value, which varies in accordance with inverter source voltage and synchronous machine field current, but less than a fixed maximum value, and means coupled to said synchronous machine and said DC source for providing said amplitude limiter with a signal establishing said minimum value in accordance with synchronous machine field current and inverter source voltage.

10. The invention according to claim 9 wherein said means coupled to said synchronous machine and said DC source comprises:

(a) a function generator coupled to said synchronous machine and said DC source for providing, in accordance with the magnitude of synchronous machine field current and DC source output voltage, an output signal which varies in accordance with a maximum allowable inverter link current;

(b) summing amplifier means coupled at a first input to said function generator and adapted to be supplied at a second input with a signal which varies in accordance with the actual magnitude of inverter link current, said summing amplifier means providing an error signal in accordance with the difference magnitude between said function generator output signal and actual inverter link current;

(c) gain network means coupled to said summing means for amplifying said summing means output signal; and (d) a limiter coupled to said gain network means for amplitude limiting said gain network means output signal.

* * * * *